United States Patent
Qiao et al.

(10) Patent No.: US 11,625,252 B2
(45) Date of Patent: Apr. 11, 2023

(54) SELECTING APPLICATIONS BASED ON FEATURES OF A FILE

(71) Applicant: Citrix Systems, Inc., Fort Lauderdale, FL (US)

(72) Inventors: Zongpeng Qiao, Nanjing (CN); Xiaolu Chu, Nanjing (CN); Xiao Zhang, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 227 days.

(21) Appl. No.: 16/897,599

(22) Filed: Jun. 10, 2020

(65) Prior Publication Data

US 2021/0326143 A1    Oct. 21, 2021

Related U.S. Application Data

(63) Continuation of application No. PCT/CN2020/085047, filed on Apr. 16, 2020.

(51) Int. Cl.
*G06F 9/445*    (2018.01)
*H04N 21/482*   (2011.01)
*G06F 9/54*     (2006.01)

(52) U.S. Cl.
CPC .......... *G06F 9/445* (2013.01); *G06F 9/44505* (2013.01); *G06F 9/54* (2013.01); *H04N 21/4826* (2013.01)

(58) Field of Classification Search
None
See application file for complete search history.

(56) References Cited

U.S. PATENT DOCUMENTS

| | | | | |
|---|---|---|---|---|
| 7,752,600 | B2* | 7/2010 | Laborczfalvi | G06F 9/44505 719/328 |
| 8,421,806 | B2* | 4/2013 | Dufourd | H04N 21/44012 345/473 |
| 8,566,329 | B1* | 10/2013 | Freed | G06F 16/24578 707/913 |
| 10,924,528 | B1* | 2/2021 | Korobov | G06F 16/178 |
| 10,972,435 | B2* | 4/2021 | Biran | G06F 21/52 |
| 11,019,156 | B1* | 5/2021 | Campbell | G06F 9/44505 |
| 11,386,510 | B2* | 7/2022 | Al-Kofahi | G06F 16/332 |
| 2014/0068676 | A1* | 3/2014 | Lin | H04N 21/8455 725/50 |

(Continued)

FOREIGN PATENT DOCUMENTS

| | | |
|---|---|---|
| CN | 106547886 A | 3/2017 |
| CN | 107390997 A | 11/2017 |
| JP | 2005-174025 A | 6/2005 |

OTHER PUBLICATIONS

International Search Report and Written Opinion on PCT Appl. No. PCT/CN2020/085047 dated Jan. 6, 2021.

*Primary Examiner* — Abu Zar Ghaffari

(57) ABSTRACT

Described embodiments provide systems and methods selecting one or more applications to launch based in part on features of a file. A device can receive a file from a user of a client device. The device can select, according to a file type of the file, an algorithm to identify one or more features of the file. The device can determine, according to the one or more features, one or more applications to execute the file on the client device. The device can provide, to the user through the client device, a listing of the one or more applications to execute the file.

15 Claims, 8 Drawing Sheets

(56) References Cited

U.S. PATENT DOCUMENTS

| | | | | |
|---|---|---|---|---|
| 2015/0206530 A1* | 7/2015 | Choi | ................ | G10L 15/22 |
| | | | | 704/249 |
| 2017/0171621 A1* | 6/2017 | Zhu | ................ | G06F 16/738 |
| 2018/0004771 A1* | 1/2018 | Benraz | ................ | G06F 16/178 |
| 2018/0253439 A1* | 9/2018 | Ramirez | ................ | G06F 21/564 |
| 2019/0260836 A1* | 8/2019 | Zahl | ................ | H04L 67/06 |
| 2021/0073617 A1* | 3/2021 | Bazzani | ................ | G06F 17/18 |
| 2021/0081695 A1* | 3/2021 | Wang | ................ | G06V 20/62 |
| 2021/0192293 A1* | 6/2021 | Wiltshire | ................ | G06V 20/00 |

* cited by examiner

SELECTING APPLICATIONS BASED ON FEATURES OF A FILE

CROSS-REFERENCE TO RELATED APPLICATION

This application claims priority to and the benefit of International Patent Application No. PCT/CN2020/085047, titled "SELECTING APPLICATIONS BASED ON FEATURES OF A FILE," and filed on Apr. 16, 2020, the contents of which are hereby incorporated herein by reference in its entirety for all purposes.

BACKGROUND

In network environments, users can access a plurality of resources or applications through a server to complete various tasks or assignments. However, each task or assignment may require the use of multiple different resources or applications to complete. For example, the user can be required to individually find and access multiple different resources or applications resulting in delays in completing the respective task or assignment.

SUMMARY

Systems and method for selecting one or more applications to launch based in part on features of a file are provided herein. A device can receive a file from a user through a client device of the user. In embodiments, the device can include or correspond to a client application provided to the user through the client device. The user can upload (e.g., drag and drop) the file to a user interface of the client application. The client application can include or be connected to multiple services (e.g., first service, second service) to analyze the file and determine one or more applications to launch for the user to interact with the file.

For example, the client application can forward or provide the file to a first service to analyze and determine (e.g., extract, identify) one or more features (e.g., text, images, characters, symbols) of the file. The first service can determine a file type of the file, such as but is not limited to, determine if the file corresponds to a text file or an image file or a combination of a text file and image file. The device can select an algorithm to identify and/or extract the features of the file based in part on the file type of the file and execute the selected algorithm to identify the features of the file. The second service can receive a request, including the file type and the identified features of the file, to determine one or more applications to launch. The second service can provide the one or more determined applications to the device. The device can determine if the second service provided a single application or multiple applications. For example, in some embodiments, if a single application was provided, the device can launch the respective application for the user through the client device. In embodiments, if multiple applications were provided, the device can provide a listing of the applications to the user through the client device. For example, the device can generate or provide a user interface including the listing of applications for the user to select at least one application to launch. The device can receive a selection and access a record associated with the user and/or the selected application to apply data to the application prior to launching the selected application for the user.

In some embodiments, the device can apply data to the selected application including, the extracted features from the file, one or more previous applications sessions and/or data associated with the user (e.g., personal information, user profile information). The device can launch the selected application for the user with the applied data through the client device. Thus, the device can intelligently determine and identify which applications to launch for a user by analyzing the features of a provided file or input file.

In at least one aspect, a method is provided. The method can include receiving, by a device, a file from a user of a client device. The method can include selecting, by the device according to a file type of the file, an algorithm to identify one or more features of the file. The method can include determining, by the device, according to the one or more features, one or more applications to execute the file on the client device. The method can include providing, by the device to the user through the client device, a listing of the one or more applications to execute the file.

In embodiments, the method can include determining, by the device, whether the one or more features of the file include one of: text, alphanumeric characters or symbols and determining, by the device, the file type of the file. The method can include executing, by the device, the algorithm to predict one or more sequences of the file according to text, alphanumeric characters or symbols of the file and determining, by the device responsive to executing the algorithm, the one or more sequences of the file. The method can include executing, by the device, the algorithm to classify an image of the file and determining, by the device responsive to executing the algorithm, one or more objects according to the image of the file.

In embodiments, the method can include filtering, by the device according to the file type of the file, a plurality of applications to execute the file and generating, by the device, a first subset of the plurality of applications to execute the file. The method can include filtering, by the device according to the one or more features, the first subset of the plurality of applications to generate a second subset of the plurality of applications to execute the file. The method can include determining, by the device, scores for applications included in the second subset according to the one or more features and the user of the client device. The method can include selecting, by the device from the second subset, the one or more applications for the listing of the one or more applications according to the score assigned to each of the applications included in the second subset.

The method can include transmitting, by the device to a service associated with the device, a request for a record associated with user and receiving, by the device from the service, a response including the record associated with the user. The method can include applying, by the device, the one or more features and data from the record to an application from the listing of one or more applications prior to executing the application for the user.

In at least one aspect, a system is provided. The system can include a device comprising one or more processors coupled to memory. The device can be configured to receive a file from a user of a client device. The device can be configured to select, according to a file type of the file, an algorithm to identify one or more features of the file. The device can be configured to determine, according to the one or more features, one or more applications to execute the file on the client device. The device can be configured to provide, to the user through the client device, a listing of the one or more applications to execute the file.

In embodiments, the device can be configured to determine whether the one or more features of the file include one of: text, alphanumeric characters or symbols and determine the file type of the file. The device can be configured to execute the algorithm to predict one or more sequences of the file according to text, alphanumeric characters or symbols of the file and determine, responsive to executing the algorithm, the one or more sequences of the file. The device can be configured to execute the algorithm to classify an image of the file and determine, responsive to executing the algorithm, one or more objects according to the image of the file.

In embodiments, the device can be configured to filter, according to the file type of the file, a plurality of applications to execute the file and generate a first subset of the plurality of applications to execute the file. The device can be configured to filter, according to the one or more features, the first subset of the plurality of applications to generate a second subset of the plurality of applications to execute the file and determine scores for applications included in the second subset according to the one or more features and the user of the client device.

The device can be configured to select, from the second subset, the one or more applications for the listing of the one or more applications according to the score assigned to each of the applications included in the second subset. The device can be configured to transmit, to a service associated with the device, a request for a record associated with user and receive, from the service, a response including the record associated with the user. The device can be configured to apply the one or more features and data from the record to an application from the listing of one or more applications prior to executing the application for the user.

In at least one aspect, this disclosure is directed to a non-transitory computer-readable medium. The non-transitory computer-readable medium can include instructions that, when executed by the processor of a device, cause the processor to receive a file from a user of a client device. The non-transitory computer-readable medium can include instructions that, when executed by the processor of a device, cause the processor to select, according to a file type of the file, an algorithm to identify one or more features of the file. The non-transitory computer-readable medium can include instructions that, when executed by the processor of a device, cause the processor to determine, according to the one or more features, one or more applications to execute the file on the client device. The non-transitory computer-readable medium can include instructions that, when executed by the processor of a device, cause the processor to provide, to the user through the client device, a listing of the one or more applications to execute the file.

In embodiments, the non-transitory computer-readable medium can include instructions that, when executed by the processor of a device, cause the processor to receive, from a service, a response including a record associated with the user. The non-transitory computer-readable medium can include instructions that, when executed by the processor of a device, cause the processor to apply the one or more features and data from the record to an application from the listing of one or more applications prior to executing the application for the user.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 4A:
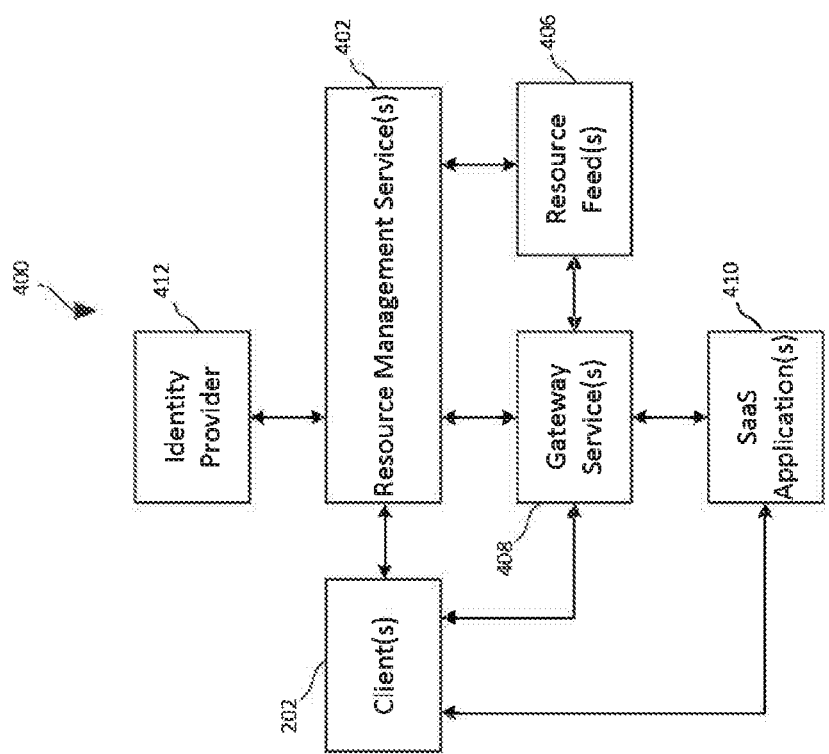
FIG. 4A is a block diagram of an example system in which resource management services may manage and streamline access by clients to resource feeds (via one or more gateway services) and/or software-as-a-service (SaaS) applications.
Figure 4B:
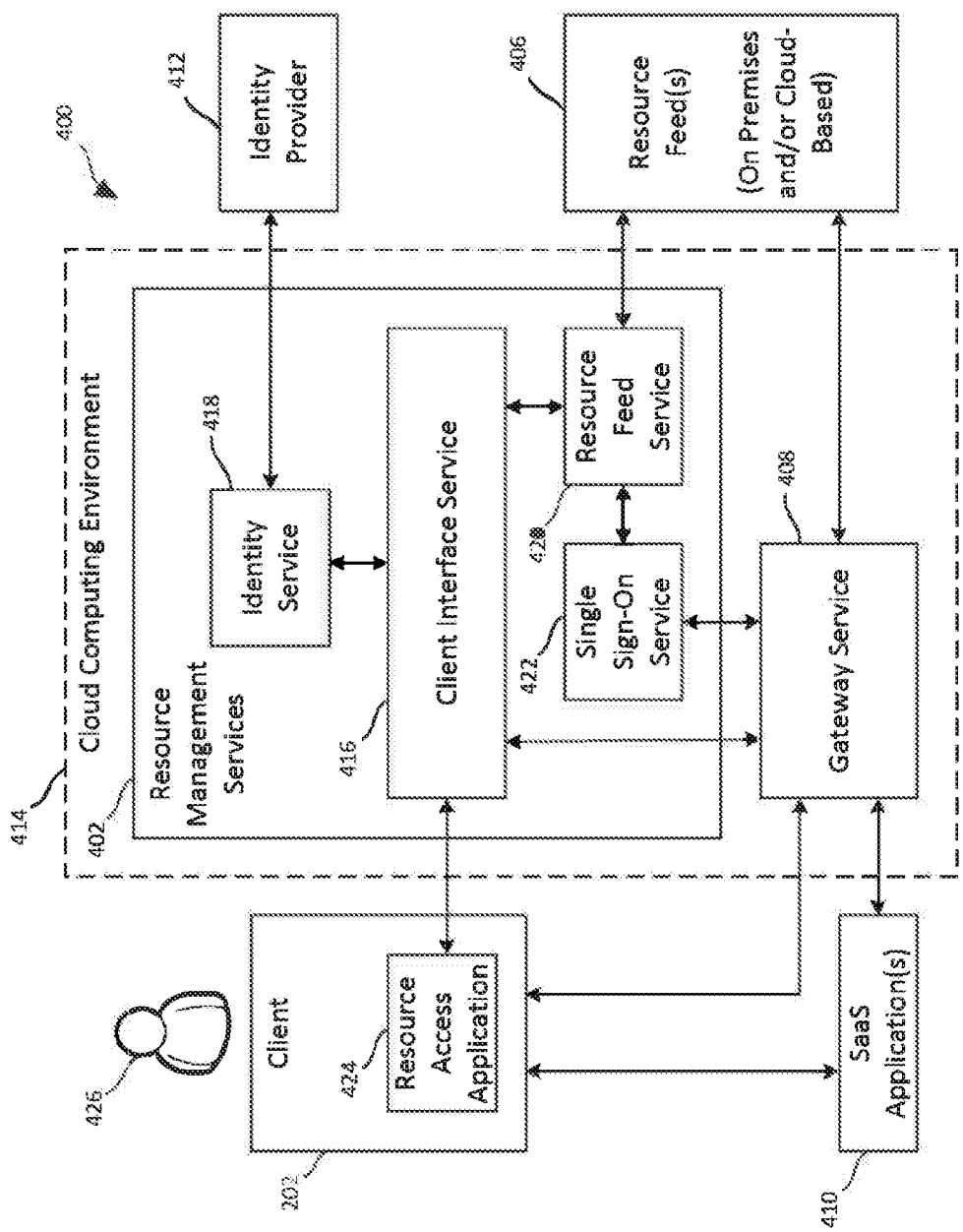
Figure 4C:
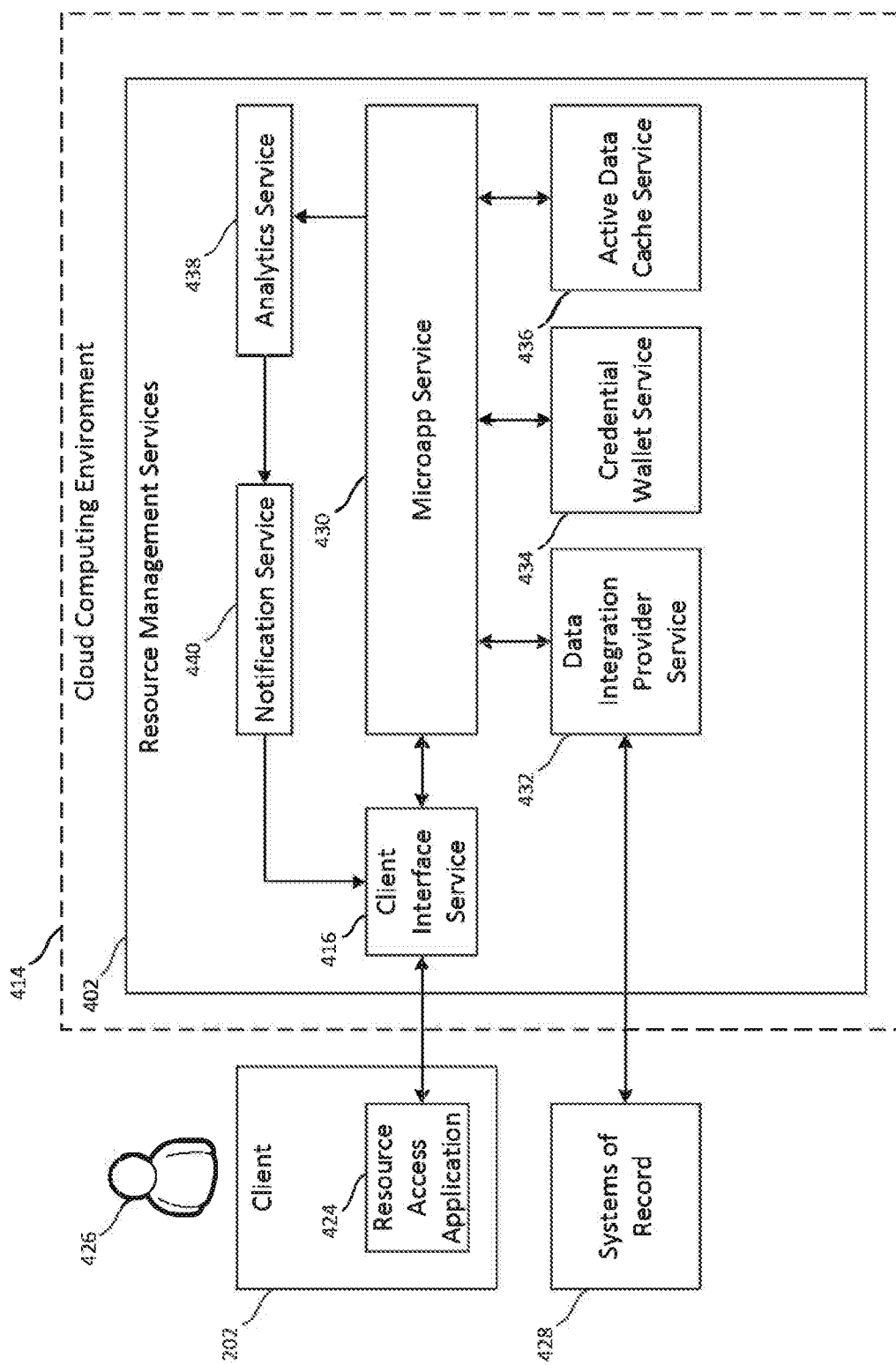

FIG. 4B is a block diagram showing an example implementation of the system shown in FIG. 4A in which various resource management services as well as a gateway service are located within a cloud computing environment; and FIG. 4C is a block diagram similar to that shown in FIG. 4B but in which the available resources are represented by a single box labeled "systems of record," and further in which several different services are included among the resource management services.

DETAILED DESCRIPTION

Systems and method for selecting one or more applications to launch based in part on features of a file are provided herein. For example, a user may want to complete a task or assignment associated with a file. The user can find a first application to open or interact with the file. The user finds the first application, launches the application, opens a window (e.g., dialog box) to upload the file and then fill in a plurality of fields of the first application with information from the file. The user may experience an issue with the upload and/or launching of the first application and access a second application to address the upload issue and/or a third application to address the issue with launching of the first application. The user may want to share the file with others and access a fourth or additional application to share the file or features of the file with others. Thus, the user needs to actively identify and launch multiple different applications and/or resources to upload and interact with a single file. The series of interactions can cause delays in the ability of the user to access the file and/or provide more opportunities for errors (e.g., human error, system errors) to occur.

The systems and methods described herein can provide a more efficient and intelligent approach to select an application to launch for a user based in part on a provided file. The devices, systems and methods described herein can identify and launch an application based on one or more features and/or properties of an input file. For example, a device can receive a file from a user, for example, when the user provides the file (e.g., drag and drop) to the device through a user interface (e.g., window) of a client device. The device can analyze, identify and extract features from the file to find an appropriate application or list of applications to launch for the user to interact with the file. In embodiments, the user can select to open the file using the provided application or upload the file directly to a specific application. Thus, the number of applications and resources a user has to access or find on a client device (e.g., mobile phone, handheld device) and a time spent identifying the correct application can be reduced to increase or improve an overall user experience.

In embodiments, such as using a mobile device, the user can provide a file to a client application of the respective mobile device and one or more applications can be provided to the user to open the file on the mobile device. The file can include an image file and the one or more applications can be provided within a menu bar or pop up window of the client application. The client application can analyze the file to identify objects within the image file and select the one or more applications (e.g., camera application, photo application, image editing application) based in part on the identified objects of the image file. Thus, the systems and methods described herein can streamline the number of actions a user performs to access or interact with a particular file and intelligently identify which applications to launch for a user based in part on the features of the provided file.

The device can include or connect with multiple services to analyze received files and generate application recommendations. For example, in some embodiments, the device access or connect with a first service to analyze, identify and/or extract one or more features of a file. The first service or analysis service can identify or extract features, including but are not limited to, text, objects, symbols or characters from the file using one or more algorithms selected based in part on a file type of the file. The device can access or connect with a second service to generate one or more recommended applications for the user responsive to the identified features of the file. The second service or recommendation service can receive the file type and features from the file and determine one or more applications to provide or recommend to the user. The number of recommended applications can include a single application or two or more applications. The services can be components or functions of the device or can connect with the device through a network or cloud computing environment to perform tasks (e.g., analysis, recommendations) for the device. In some embodiments, the device can generate and maintain records for each user and the records can include user file upload behavior, previous files, previous accessed applications and/or information personal to the user. In some embodiments, an image file can be received through a camera or image device and through an application (e.g., camera application, image editing application) executing on the device. The device can dynamically generate a list of recommended applications to interact with or edit the image file and provide the list of recommended applications within the application and in a same or common display with the received image file. For example, in one embodiment, an image file can be scanned using a camera device connected to the device or using a phone camera and the recommendation list of applications can be provided or rendered within the viewpoint of the respective camera application (e.g., rendered below the scanned image within the camera application) without leaving or exiting the camera application.

The device can, through the second service, access a record associated with the user and/or the selected application, and apply data from the record to the selected application, for example, to enter or fill in the data for the selected application (e.g., single sign on for data). For example, the device can fill in or enter the data into one or more fields of the application. Thus, from a user perspective, the selected application is provided or launched to the user having data associated with the user and the application already filled in.

Section A describes a computing environment which may be useful for practicing embodiments described herein; and Section B describes methods and systems for selecting an application to launch based on features of a file.

A. Computing Environment

Prior to discussing the specifics of embodiments of the systems and methods of for securing offline data (e.g., browser offline data) for shared accounts, it may be helpful to discuss the computing environments in which such embodiments may be deployed.

Figure 1A:
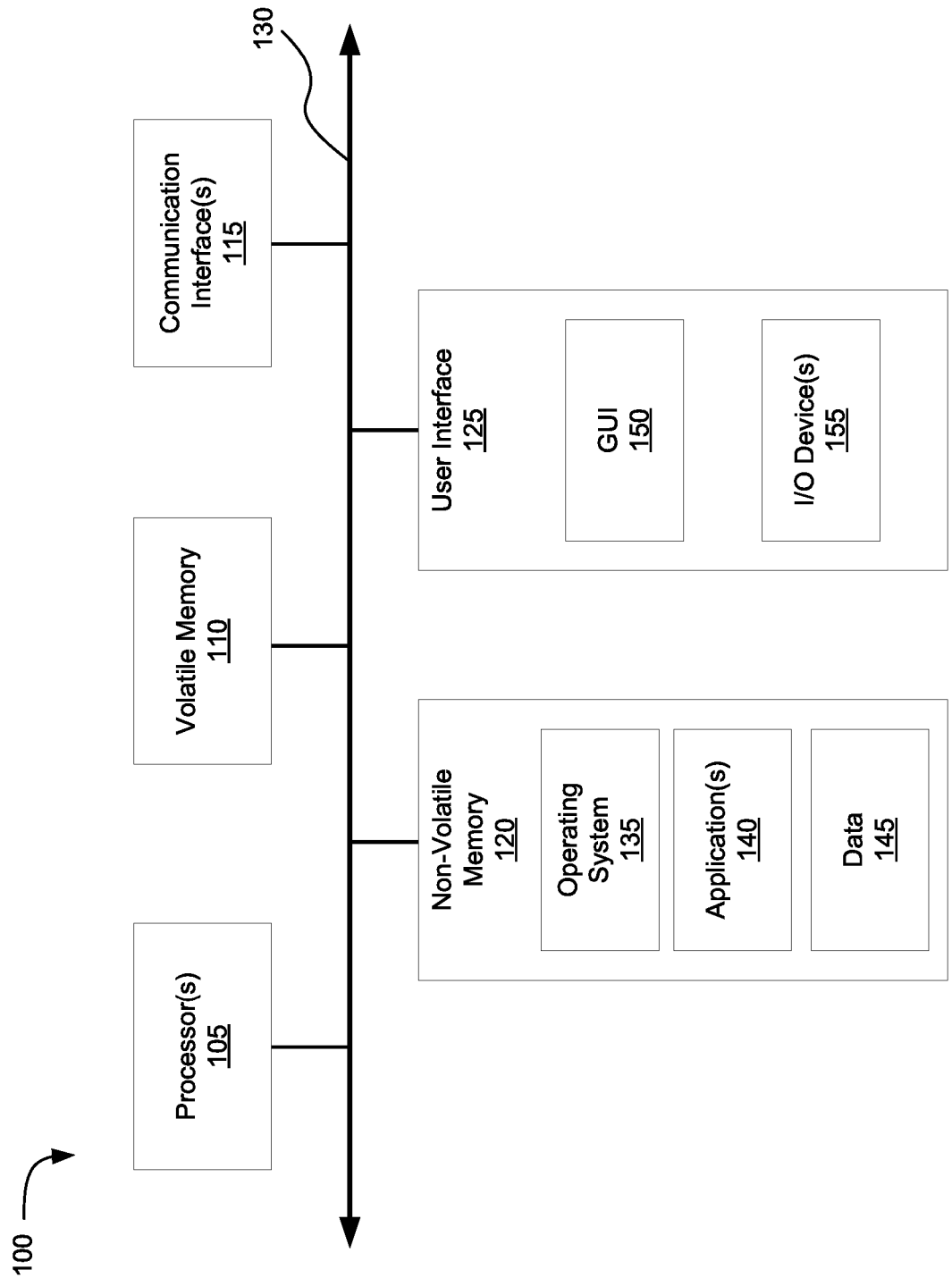
FIG. 1A is a block diagram of embodiments of a computing device.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
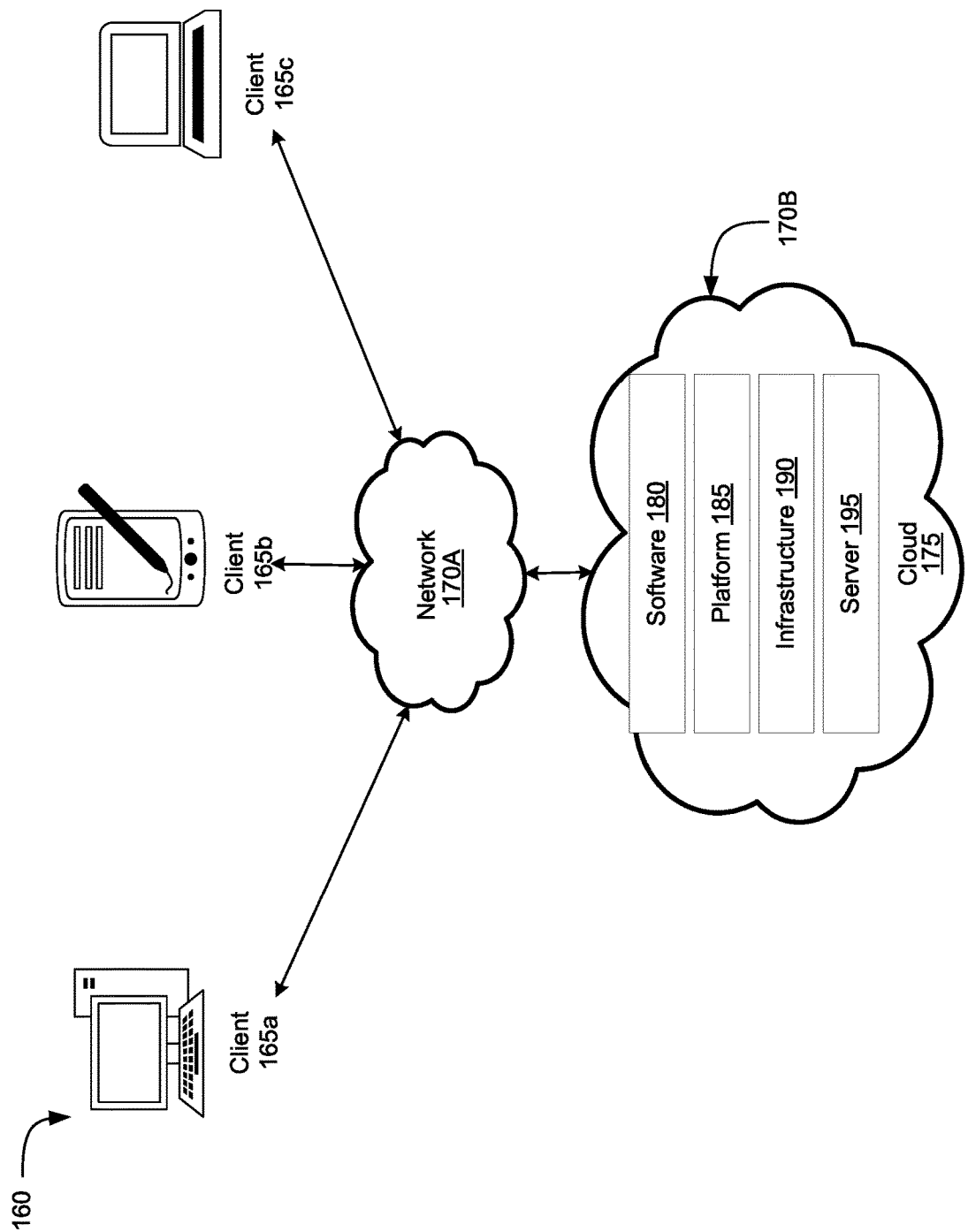
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but are not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Selecting an Application to Launch Based on Features of a File

Systems and method for selecting one or more applications to launch based in part on features of a file are provided herein. A device (e.g., client application on a client device) can receive a file from a user through a user interface provided to the user through a client device. In some embodiments, the user can select to receive recommendations for an application to access the file or upload the file directly to the device. The device can leverage or access one or more services to analyze the file and generate the recommendations for an application. For example, the device can, through a first service, analyze the file to identify and/or extract one or more features from the file. The device can, through a second service, determine one or more recommended applications to launch for the file based in part on the file type of the file and the one or more features of the file.

In some embodiments, the device can determine a single application to launch for the file and launch or provide the application to the user through a client device. In some embodiments, the number of recommended applications can be greater than one and the device can generate a listing of the applications and provide the listing to the user through the client device. The device can receive a selection from the user of at least one application from the listing of recommended applications. The device can, through the second service, access a record associated with the user and/or the selected application, and apply data from the record to the selected application, for example, to enter or fill in the data for the selected application (e.g., single sign on for data). For example, the device can fill in or enter the data into one or more fields of the application. Thus, from a user perspective, the selected application is provided or launched to the user having data associated with the user and the application already filled in.

Figure 2:
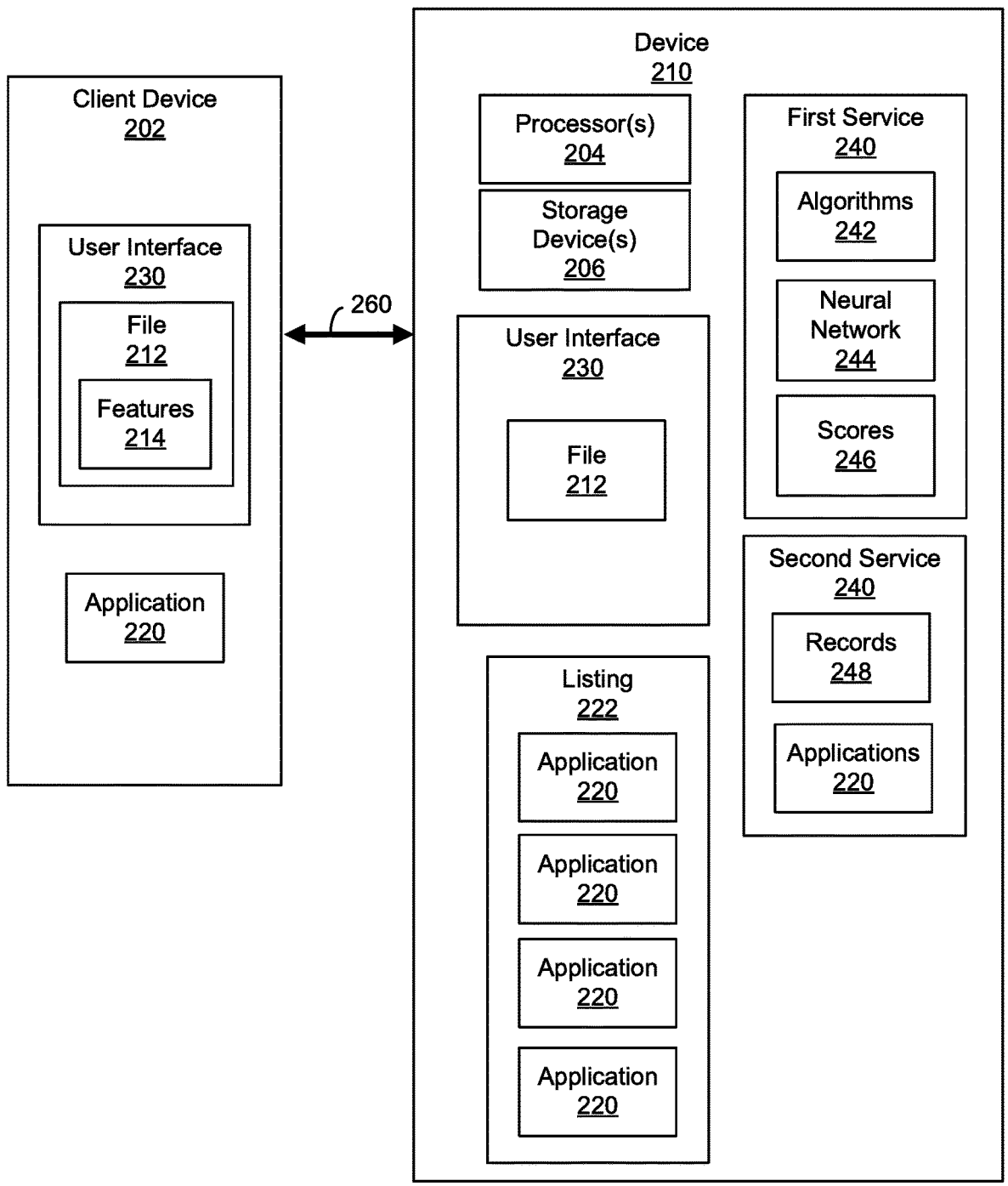
FIG. 2 is a block diagram of a system for selecting one or more applications to launch based in part on features of a file.

Referring to FIG. 2, depicted is a block diagram of one embodiment of an environment 200 having a device 210 (e.g., workspace server) providing access to a plurality of applications 220 (e.g., resources) for a client device 202. In embodiments, the environment 200 can be the same as or substantially similar to the system 400 of FIGS. 4A-4B or the cloud computing environment 414 of FIGS. 4B-4C. The device 210 can include or correspond to a client application that is provided to or executing on a client device 202 to provide access to or host one or more applications 220 for a user (e.g., user 426 of FIG. 4B) of the client device 202. The device 210 can broker and provide access to different applications 220 for the client device 202, for example, in response to a received file 212. In some embodiments, the device 210 can be a workspace platform server or traffic management server configured to control access to the different applications 220 for one or more client devices 210.

The device 210 can be implemented using hardware or a combination of software and hardware. For example, each component of the device 210 can include logical circuitry (e.g., a central processing unit or CPU) that responses to and processes instructions fetched from a memory unit (e.g., storage device 206). Each component of the device 210 can include or use a microprocessor or a multi-core processor. A multi-core processor can include two or more processing units (e.g., processor 204) on a single computing component. Each component of the device 210 can be based on any of these processors, or any other processor capable of operating as described herein. Each processor can utilize instruction level parallelism, thread level parallelism, different levels of cache, etc. For example, the device 210 can include at least one logic device such as a computing device or server having at least one processor 204 to communicate. The components and elements of the device 210 can be separate components or a single component. The device 210 can include a memory component (e.g., storage device 206) to store and retrieve data (e.g., file features 214, records 248). The memory can include a random access memory (RAM) or other dynamic storage device, coupled with the storage device 206 for storing information, and instructions to be executed by the device 210. The memory can include at least one read only memory (ROM) or other static storage device coupled with the storage device 206 for storing static information and instructions for the device 210. The memory can include a storage device 206, such as a solid state device, magnetic disk or optical disk, to persistently store information and instructions. The device 210 can be the same as or substantially similar to computer 100 of FIG. 1A, computing environment 160 of FIG. 1B and/or resource management service 402 of FIGS. 4A-4C. In embodiments, the device 210 can be the same or substantially similar to cloud computing environment 414 of FIGS. 4B-4C.

The device 210 can include a processor 204. The processor 204 can include non-volatile memory that stores computer instructions and an operating system. For example, the computer instructions can be executed by the processor 204 out of volatile memory to perform all or part of the method 300. In some embodiments, the device 210 can include a non-transitory computer-readable medium, comprising instructions that, when executed by the processor 204 of the device 210, cause the processor 204 to perform all or part of the method 300. The processor 204 can include a database and be configured to generate and/or store records 248 for one or more users of one or more client devices 210.

In some embodiments, the processor 204 can analyze and/or interact with a file 212 received from a client device 202 to identify or extract one or more file features 214 from the file 212. The file 212 can include a computer resource, data and/or information provided by the client device 202 to the device 210. The file 212 can include a variety of different file types, including but is not limited to, a text file, an image file, an audio file, a word file, or a file having a combination of text, image, audio features. The features 214 can include, but are not limited to, text, objects, characters, symbols and/or alphanumeric characters. The processor 204 can couple with and interact with a first service 240 and/or a second service 240 to analyze and generate recommendations for one or more applications 220 to launch responsive to the received file 212. The processor 204 can include non-volatile memory that stores computer instructions and an operating system. For example, the computer instructions can be executed by the processor 204 out of volatile memory to perform all or part of the method 300. The device 210 can include a non-transitory computer-readable medium that includes instructions that, when executed by the processor 204 of the device 210 cause the processor 204 to execute or perform the functionalities of the method 300.

The device 210 can generate a user interface 230. For example, the device 210 can generate, render and/or provide a user interface 230 to a client device 202 to receive one or more files 212. The user interface 230 can include a graphical user interface, an application, object (e.g., virtual object), or window (e.g., pop up window) generated within a portion of a display area of the client device 202. The user interface 230 can include code, script or a set of commands to receive a file 212 and upload, transmit or provide the file 212 to the device 210. The device 210 can select dimensions for the user interface 230 based in part on dimensions of a display area of the client device 202. The user interface 230 can include a drop area, for example, to drag and drop a file 212 to upload the file or otherwise provide the file 212 to the device 210.

The device 210 can include or connect with one or more services 240 to identify and/or extract one or more file features 214 from a file 212 and to generate one or more recommendations for applications 220 responsive to the file 212. The services 240 can include hardware, software and/or a combination of hardware and software to perform one or more tasks or execute one or more data requests for the device 210. For example, the services 240 can be implemented using hardware or a combination of software and hardware. Each component of the services 240 can include logical circuitry (e.g., a central processing unit or CPU) that responses to and processes instructions fetched from a memory unit (e.g., storage device 206). The services 240 can include or use a microprocessor or a multi-core processor. A multi-core processor can include two or more processing units on a single computing component. Each component of the services 240 can be based on any of these processors, or any other processor capable of operating as described herein. In embodiments, the services 240 can include or correspond to the resource management service 402 of FIGS. 4A-4B, the resource feed 406 of FIGS. 4A-4B, the gateway service 408 of FIGS. 4A-4B, the identity provider 412 of FIGS. 4A-4B, the client interface service 416 of FIG. 4B, the identify service 418 of FIG. 4B, the resource feed service 420 of FIG. 4B, the single sign-on service 422 of FIG. 4B, the systems of record 428 of FIG. 4C, the microapp service 430 of FIG. 4C, the data integration provider service 432 of FIG. 4C, the credential wallet service 434 of FIG. 4C, and the active data cache service 436 of FIG. 4C.

In some embodiments, the device 210 can include or connect with a first service 240 and a second service 240. The first service 240 can include or correspond to analysis service or extraction service to identify and/or extract features 214 from a file 212. The first service 240 can include and/or execute one or more algorithms 242 and/or one or more neural networks 244 to identify and/or extract features 214 from a file 212. The algorithms 242 and/or neural networks 244 can include, but are not limited to, a classifier, classification model, k-nearest neighbors, naïve bayes classifier, support vector machine, and/or learning algorithm. For example, the algorithms 242 and/or neural networks 244 can include or execute one or more of a connectionist text proposal network (CTPN), one or more convolutional layers, one or more recurrent layers, one or more transcription layers, a recurrent neural network (RNN), long-short term RNN, convolutional neural network (e.g., VGG16 model), convolutional recurrent neural network (CRNN), and/or a connectionist temporal classification (CTC). The device 210 can select an algorithm 242 and/or a neural network 244 for a file 212 based in part on a file type of the respective file 212. In embodiments, the device 210 can select and/or execute multiple algorithms 242 and/or neural networks 244 to analyze a file 212.

The first service 240 can generate one or more scores 246. The scores 246 can correspond to or represent a relation between an application 220 and a file 212 and/or a relevance between an application 220 and a file 212. The relation and/or relevance score 246 can be assigned to an application 220 in part on one or more previous user sessions with the application 220, the file 212, one or more records 248 (e.g., user records), a file type and/or an application type. For example, a first relevance score 246 (e.g., high relevance, greater relevance) can be assigned to an application 220 if the user had previously selected the application 220 to use to interact with the same file 212, similar file 212 (e.g., same file type, similar file type), and/or to perform a similar task for the file 212 (e.g., edit photo, edit text, upload receipt). A second relevance score 246 (e.g., low relevance, lower relevance) can be assigned to an application 220 if the user has not previously selected the application 220 to use to interact with the same file 212, similar file 212 (e.g., same file type, similar file type), and/or to perform a similar task for the file 212 (e.g., edit photo, edit text, upload receipt). The device 210 can rank applications 220 based in part on a score 246 assigned to the respective application 220. In embodiments, the device 210 can provide a listing 222 of applications 220 with the applications 220 ordered within the listing 222 using the score 246 assigned to each of the applications 220.

The second service 240 can include or correspond to a recommendation service and/or a record service. For example, the device 210 can execute or connect with the second service 240 to select one or more applications to launch for a file 212 or to provide as a listing 222 to a client device 202. The second service 240 can identify and select the one or more applications 220 using the features 214 of the file 212, the file type of the file 212 and/or one or more records 248. In some embodiments, the second service 240 can receive the features 214 of the file 212, the file type of the file 212 from the first service 240 (e.g., call from the first service 240 to the second service 240). The second service 240 can identify a single application 220 for a file 212 or multiple applications 220 for a file 212. The second service 240 can provide the recommended application 220 or recommended multiple applications 220 (e.g., listing 222) to the device 210.

In embodiments, the device 210 can execute or connect with the second service 240 to retrieve one or more records 248 for a user, a client device 202, a file 212, features 214, and/or an application 220. For example, the records 248 can include records for one or more user profiles, one or more previous user sessions, one or more client devices 210, one or more files 212, one or more previous session with a file 212, one or more features 214 for one or more files 212, one or more applications 220, and/or one or more previous sessions with an application 220. The device 210 can maintain the records 248 in the storage device 206 and/or on the second service 240. In some embodiments, the second service 240 can include a memory or storage device 206 to store, update and maintain the records 248 for the device 210.

The device 210 can execute or connect with the second service 240 to apply data to a file 212, for example, prior to providing the file 212 to a user though an application 220. For example, the device 210 can use data (e.g., personal data, login information, passwords, configuration data) from one or more records 248 to fill-in or populate one or more fields of a file or apply the data to the respective file 212 and application 220. In embodiments, the device 210 can include or connect with a single service 240, two services 240 or more than two services 240 based in part on properties of one or more files 212 received.

The device 210 can generate, provide or render a listing 222 of applications 220 to a user through the client device 202. The listing 222 can include a menu, window (e.g., pop-up window), and/or user interface rendered within a display area of the client device 202. The listing 222 can include a plurality of icons, symbols, links or selectable objects linked with or associated with at least one application 220 for the device 210 to receive a selection of an application 220. In some embodiments, the device 210 can execute an algorithm 242 to perform text detection. The device 210 can execute the algorithm 242 to determine if the file 212 includes text, text portions or if an image file 212 includes text. In one embodiment, the algorithm 242 can include a connectionist text proposal network to determine if the file 212 includes text.

The applications 220 can include resources, desktops, and or files. In embodiments, the applications 220 can include local applications (e.g., local to a client device 202), hosted applications, Software as a Service (SaaS) applications, virtual desktops, virtual applications, web applications, mobile applications, and other forms of content. In some embodiments, the applications 220 can include or correspond to applications provided by remote servers or third party servers. In embodiments, the applications 220 can include or correspond to the SaaS applications 410 of FIGS. 4A-4B.

The client device 202 can include, but is not limited to a computing device or a mobile device. The client device 202 can include or correspond to an instance of any client device, mobile device or computer device described herein. For example, the client device 202 can be the same as or substantially similar to computer 100 of FIG. 1A and client 202 of FIGS. 4A-4C. The client device 202 can couple with the device 210 through one or more connections 260. In embodiments, the client device 202 can execute or run a client application, for example, provided by device 210 to provide access to an application 220 or to enable access to an application 220. For example, the client application can execute or run within a browser (e.g., embedded browser) of the client device 202. The client device 202 can couple with or connect with the device 210 through a connection 260 to access at least one application hosted or provided by the device 210. The connections 260 can correspond to or be used to establish an application session, an execution session, a desktop session, a hosted desktop session, a terminal services session, a browser session, a remote desktop session, a URL session and/or a remote application session. The connections 260 may include encrypted and/or secure sessions established between the device 210 and a client device 202. For example, a connection 260 may include an encrypted session and/or a secure session established between the device 210 and a client device 202. The encrypted connection 260 can include an encrypted file, encrypted data or traffic transmitted between the device 210 and a client device 202.

Each of the above-mentioned elements or entities is implemented in hardware, or a combination of hardware and software, in one or more embodiments. Each component of the device 210 may be implemented using hardware or a combination of hardware or software detailed above in connection with FIGS. 1A-1B and FIGS. 4A-4C. For instance, each of these elements or entities can include any application, program, library, script, task, service, process or any type and form of executable instructions executing on hardware of a device (e.g., device 210). The hardware includes circuitry such as one or more processors in one or more embodiments.

Figure 3A:
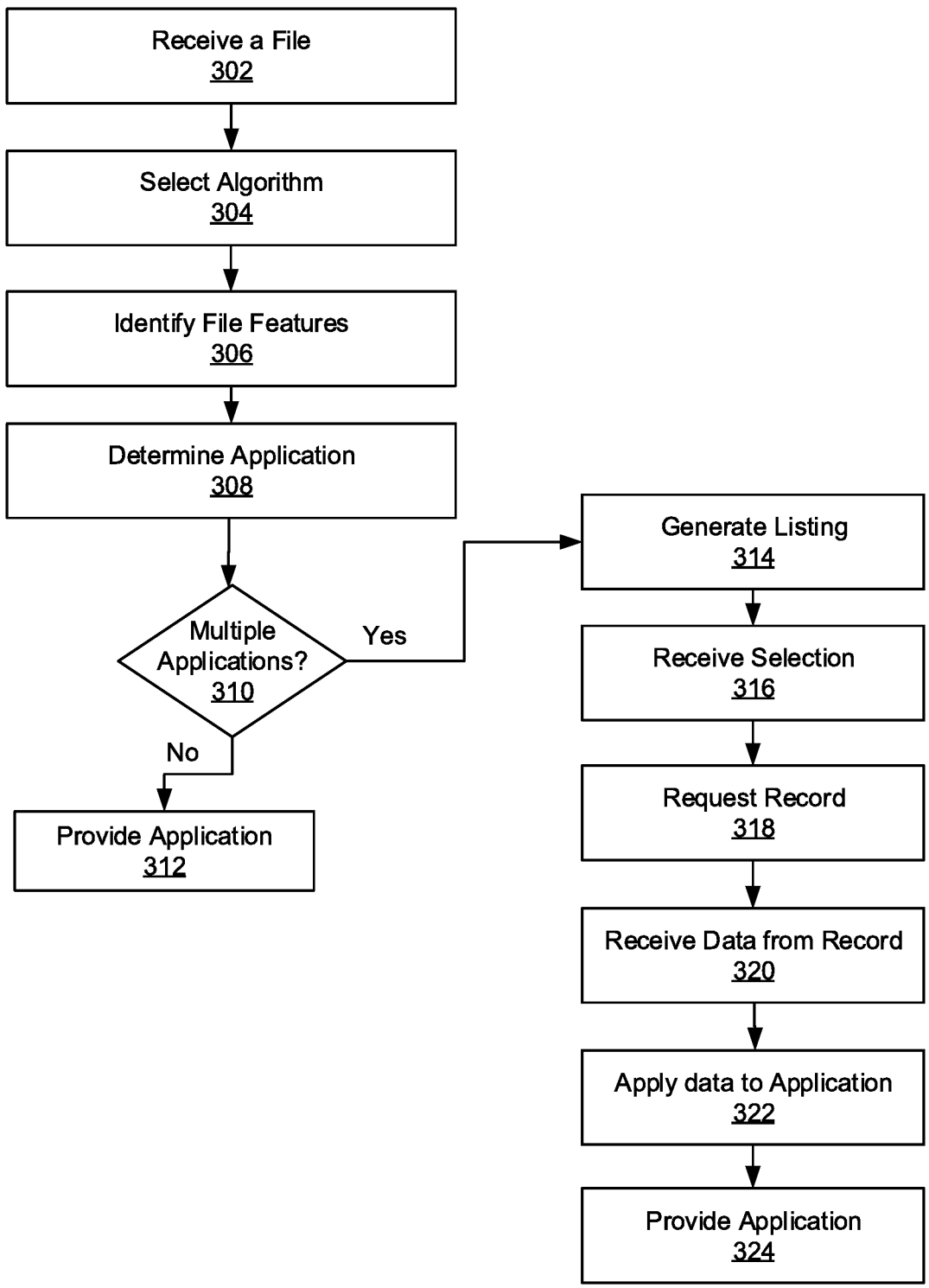
FIG. 3A is a flow diagram of a method for selecting one or more applications to launch based in part on features of a file.

Referring now to FIG. 3A, depicted is a flow diagram of one embodiment of a method 300 for selecting one or more applications to launch based in part on features of a file. In brief overview, the method 300 can include one or more of: receiving a file (302), selecting an algorithm (304), identifying file features (306), determining applications (308), determining the number of recommended applications (310), providing an application (312), generating a listing of applications (314), receiving a selection (316), requesting a record (318), receiving data from a record (320), applying data to an application (322), and providing an application (324). The functionalities of the method 300 may be implemented using, or performed by, the components detailed herein in connection with FIGS. 1A-2 and 4A-4C.

Referring now to operation (302), and in some embodiments, a file can be received. A device 210 can receive a file 212 from a user of a client device 202. The device 210 can receive the file 212 as an upload and/or file transfer through the client device 202. For example, in some embodiments, the device 210 can include or correspond to a client application executing on the client device 202 to provide an interface for the user to interact with the client application (e.g., device 210). The user can transfer the file 212 from the client device 202 to the device 210 and/or can transfer the file 212 from one or more devices, applications or resources (e.g., mobile phone, email, image device, camera) connected to or provided by the client device 202 to the device 210. In some embodiments, the device 210 can provide a user interface 230 (e.g., window) for a user to drag and drop a file 212 (e.g., text file, image file) into the user interface 230.

Referring now to operation (304), and in some embodiments, an algorithm can be selected. The device 210 can, according to a file type of the file 212, select an algorithm to identify one or more features 214 of the file 212. The device 210 can determine the file type of the file 212. For example, the device 210 can execute a first algorithm 242 to determine the file type of the file 212. The device 210, using the first algorithm 242, can determine the file type based in part on metadata associated with the file 212 and/or features 214 of the file 212. The file 212 can include a variety of different file types, including but is not limited to, a text file, an image file, an audio file, a word file, or a file having a combination of text, image, audio features. In some embodiments, the device 210 can execute a first service 240 or connect to a first service 240 to determine the file type of the file 212. For example, the device 210 can call or transmit a request to the first service 240 to analyze the file 212 and determine the file type.

The device 210 can select at least one algorithm 242 from a plurality of algorithms 242 to identify or extract features 214 from the file 212 using the file type. For example, in some embodiments, the device 210 can execute different algorithms 242 for different file types (e.g., first algorithm for a text file, second algorithm for an image file). For combination files 212 or files 212 having a combination of different file types (e.g., image file with text), the device 210 can select multiple algorithms 242, one for each file type corresponding to the file 212. In one embodiment, the device 210 can select a first algorithm 242 according a first file type of the file 212 (e.g., text file portion) and select algorithm 242 to according to a second file type of the same file 212 (e.g., image portion).

Referring now to operation (306), and in some embodiments, one or more features can be determined. In some embodiments, the device 210 can execute algorithm 242, described herein with respect to FIG. 3B, to determine one or more features 214 (e.g., properties, characteristics) of the file 212. The file 212 can include one or more features 214, including but is not limited to, text, objects, characters, symbols and/or alphanumeric characters. The device 210 can execute the selected algorithm 242 to identify or extract features 214 from the file 212. In some embodiments, for a file 212 corresponding to multiple file types (e.g., combination file type) or having features associated with multiple file types. For example, the device 210 can execute a first algorithm 242 to identify or extract text features 214 from a file 212 and execute a second algorithm 242 to identify or extract objects from an image portion of the file 212. In some embodiments, the device 210 can determine whether the one or more features 214 of the file 212 include one of, but is not limited to, text, alphanumeric characters or symbols and determine a file type of the file based in part on the file features 214.

The device 210 can execute a first service 240 or connect to a first service 240 to identify and/or extract one or more file features 214 from the file 212. The device 210 can call or transmit a request to the first service 240 to identify and/or extract one or more file features 214 and the request can include the file type of the file 212. In embodiments, the algorithm 242 can include or correspond to a neural network 244, a classifier, classification model, k-nearest neighbors, naïve bayes classifier, support vector machine, and/or learning algorithm. For example, the algorithm 242 can include, but is not limited to, a connectionist text proposal network (CTPN), one or more convolutional layers, one or more recurrent layers, one or more transcription layers, a recurrent neural network (RNN), long-short term RNN, convolutional neural network (e.g., VGG16 model), convolutional recurrent neural network (CRNN), connectionist temporal classification (CTC).

Referring now to operation (308), and in some embodiments, one or more applications can be determined. The device 210 can determine, according to the one or more features 214, one or more applications 220 to execute the file 212. The device 210 can generate one or more recommendations for applications 220 to launch for the user of the client device 202 based in part on the file type of the file 212 and the one or more features 214 of the file 212 (e.g., extracted features of the file). For example, in one embodiment, the device 210 can identify one or more image editing applications 220 for an image file 212 using the object features 214 identified from the image file 212. In embodiments, the device 210 can identify one or more text editing applications 220 or document sharing applications 220 for a text file 212 using the text features 214 identifying from the text file 212.

In some embodiments, the device 210 can transmit a request or call a second service 240 to generate recommendations for applications 220 to launch for the user of the client device 202 to execute or interact with the file. The device 210 can transmit a request that includes the file type of the file 212 and the one or more features 214 of the file 212 to the second service 240 (e.g., includes identified features 214, includes extracted features 214). The device 210 (e.g., second service 240) can determine or filter a plurality of applications 220 based in part on the file type of the file 212, the user of the client device 202, and/or attributes of the client device 202. For example, the device 210, responsive to the feature identification or file extraction, can filter a plurality of applications 220 or records of applications 220 to identify one or more applications 220 that support the respective file type. The device 210, can filter, and according to the file type of the file 212, the features 214, a plurality of applications 220 to execute the file 212 and identify relevant applications 220 for the particular file type. The device 210 can, responsive to the filtering, generate a first subset of the plurality of applications 220 to execute the file 212. The first subset of applications 220 can correspond to one or more applications 220 that support the file type of the file 212.

The device 210 can filter the first subset of applications 220, for example, using the one or more features 214, to identify one or more relevant or related applications 220 based in part on the features 214. For example, the device 210 can filter the first subset, according to the one or more features 214 of the file 212, the first subset of the plurality of applications 220 to generate a second subset of the plurality of applications 220 to execute the file 212. The device 210 can determine scores 246 for applications 220 included in the second subset according to the one or more features 214 and the user of the client device 202, and/or the client device 202. The scores 246 can correspond to or represent a relation or relevance between an application 220 and a file 212. In some embodiments, the device 210 can determine a relevance score 246 for an application using the following equation:

$$IDF_i = \log \frac{|D|}{|\{j : t_i \in d_j\}|} \quad (3)$$

Where |{j: $t_i \in d_i$}| represents or indicates the number of documents containing the information I and |D| represents or indicates the total number of the documents.

The device 210 can assign a score 246 to an application 220 based in part on one or more previous user sessions with the application 220, the file 212, one or more records 248 (e.g., user records), a file type and/or an application type. For example, a first relevance score 246 (e.g., high relevance, greater relevance) can be assigned to an application 220 if the user had previously selected the application 220 to use to interact with the same file 212, similar file 212 (e.g., same file type, similar file type), and/or to perform a similar task for the file 212 (e.g., edit photo, edit text, upload receipt). A second relevance score 246 (e.g., low relevance, lower relevance) can be assigned to an application 220 if the user has not previously selected the application 220 to use to interact with the same file 212, similar file 212 (e.g., same file type, similar file type), and/or to perform a similar task for the file 212 (e.g., edit photo, edit text, upload receipt). The device 210 can rank applications 220 based in part on a score 246 assigned to the respective application 220. For example, the device 210 can select, from the second subset of applications 220, one or more applications 220 for the listing 222 of the one or more applications 220 according to the score 246 assigned to each of the applications 220 included in the second subset. The device 210 can provide a listing 222 of applications 220 with the applications 220 ordered within the listing 222 using the score 246 assigned to each of the applications 220. For example, the device 210 can order or arrange the applications 220 in the listing 222 using the respective relevance scores 246 assigned to each application 220.

Referring now to operation (310), and in some embodiments, a number of recommended applications can be determined. The device 210 can determine the number of applications 220 recommended for the file 212. For example, the device 210 can identify a single application 220 for the file 212 or the device 210 can identify multiple (e.g., two or more) applications 220 for the file 212. In some embodiments, the second service 240 can identify a single application 220 for the file 212 or the second service 240 can identify multiple (e.g., two or more) applications 220 for the file 212 and transmit a response to the device 210 with the single recommended application 220 or listing of multiple recommended applications 220.

The device 210 can compare the number of applications 220 to a threshold level (e.g., 1). For example, the device 210 can compare the number of applications 220 to a threshold level and determine the number of applications 220 is less than the threshold level or equal to the threshold level and determine a single application 220 was recommended. The device 210 can move to (312) of method 300 responsive to determining a single application 220 was recommended. The device 210 can compare the number of applications 220 to the threshold level and determine the number of applications 220 is greater than the threshold level and determine multiple applications 220 were recommended. The device 210 can move to (314) of method 300 responsive to determining multiple applications 220 were recommended.

Referring now to operation (312), and in some embodiments, an application can be provided. The device 210 can determine that a single application 220 was recommended and provide the application 220 to the user of the client device 202 through the client device 202. For example, the device 210 can launch the application 220, activate the application 220, start the application 220 or initiate the application 220 on or using components of the client device 202. In some embodiments, the device 210 can determine the recommended application 220 is active or running on the client device 202 and bring the application 220 to a front view or top layer of a current display of the client device 202 such that a user of the client device 202 can see and/or interact with the application. In embodiments, the device 210 can provide the application 220 to the user through a client application executing on the client device 202.

Referring now to operation (314), and in some embodiments, a listing of applications can be generated. The device 210 can determine that multiple applications 220 were recommended and generate a listing 222 of the recommended applications 220 for the user of the client device 202. For example, the device 210 can generate a user interface (e.g., window, menu) and provide the listing 222 of applications 220 in the user interface through the client device 202. The listing 222 can include two or more applications 220 and the number of applications 220 can be based in part on the number of recommended applications 220, the user of the client device 202 and the file type of the file 212. The device 210 can generate and/or provide the listing 222 through a portion of a display of the client device. The listing 222 can include icons, symbols or identifiers for each of the recommended applications 220 (e.g., selectable icons, linked icons). In some embodiments, the device 210 can provide the listing 222 within a client application executing on the client device 202 such that the listing 222 is provided or displayed with (e.g., simultaneously, dynamically) the file 212. For example, in one embodiment, an image file 212 can be received through a camera component of the client device 202 (e.g., camera of a mobile phone, camera of a handheld device) and through an application (e.g., camera application, image editing application) executing on the client device 202. The device 210 can dynamically generate the listing 222 to include a list of recommended applications 220 to interact with or edit the image file 212 and provide the listing 222 of recommended applications rendered or displayed within the viewpoint of the respective camera application (e.g., rendered below the scanned image file within the camera application) without leaving or exiting the camera application of the client device 202.

Referring now to operation (316), and in some embodiments, a selection can be received. The device 210 can receive at least one selection of an application 220 from the plurality of applications provided in the listing 222. For example, the user can select, through the listing 222, at least one application 220 to launch for the file 212. In some embodiments, the device 210 can detect a user interaction (e.g., click-on, pointer interaction) with an icon, symbol or identifier associated with the selected application 220 of the listing 222. The device 210 can receive a selection through a dialogue box, window or menu associated with the listing 222 that identifies at least one application 220 of the listing 222.

Referring now to operation (318), and in some embodiments, a record can be requested. The device 210 can request a record 248 to apply to the selected application 220. For example, the device 210 can generate and transmit a request to a second service 240 to retrieve a record 248 associated with the user and/or the client device 202 and the request can include an identifier for the user of the client device 202 and an identifier for the selected application 220. In some embodiments, the device 210 can transmit the record request to a first service 240 and the first service 240 can forward or transmit the record request to the second service 240. The device 210 can receive, from the second service 240, a response including the record 248 associated with the user and/or the client device 202.

The record 248 can include or correspond to a user profile of the user, a record of user behavior, one or more previous user sessions with the selected application 220, and/or previous user sessions with a plurality of different applications 220. The device 210 can identify a record 248 for the user and/or the selected application 220, for example, from a database of the device 210 using an identifier for the user of the client device 202 and/or an identifier for the selected application 220. In some embodiments, the second service 240 can identify a record 248 for the user and/or the selected application 220, for example, from a database of the second service 240 using an identifier for the user of the client device 202 and/or an identifier for the selected application 220.

Referring now to operation (320), and in some embodiments, data from a record can be received. The device 210 can obtain or receive data from the record 248 associated with the user of the client device 202 and/or the selected application 220. In some embodiments, the device 210 can receive the record 248 from the second service 240, through the first service 240, and extract data from the record 248. For example, the second service 240 can transmit or forward the record 248 to the first service 240 and the first service 240 can transmit or forward the record 248 to the device 210. The device 210 can identify or extract data from the record 248 that corresponds to one or more fields (e.g., text entry field), data entry inputs, instructions and/or commands of the application 220.

Referring now to operation (322), and in some embodiments, data can be applied to an application. The device 210 can apply the data from the record 248 to the selected application 220. In embodiments, the device 210 can apply the one or more features 214 and data from the record 248 to an application 220 from the listing 222 of one or more applications 220 prior to executing the application 220 for the user. For example, the device 210 can fill-in, enter, or apply the data from the record 248 to one or more fields, data entry inputs, instructions and/or commands to the application 220. The device 210 can apply user data (e.g., name, password, personal data) to the application 220. In embodiments, the device 210 can apply extracted data, extracted from the file 212, to one or more fields of the selected application 220. For example, the device 210 can extract data corresponding to the user of the client device 202 and/or data corresponding to the application 220. The device 210 can identify and extract data from the file 212 used to launch the file 212 using the selected application 220 (e.g., file type, file name, scripts) and apply the extracted data to the selected application 220. In some embodiments, the device 210 can perform single-sign-on for the user of the client device 202 by applying data to the application 220 prior to providing the application 220 to the user. For example, the device 210 can enter a user identifier and/or one or more passwords or commands into one or more fields of the application 220 to perform single-sign-on for the user of the client device 202.

Referring now to operation (324), and in some embodiments, an application can be provided. The device 210 can launch, activate or provide the selected application 220 to the user of the client device 202 through the client device 202. In embodiments, the device 210 can provide the selected application 220 having one or more fields filled in and/or data applied to the one or more fields prior to the applications 220 being provided to the client device 202.

The device 210 can launch the application 220, activate the application 220, start the application 220 or initiate the application 220 on or using components of the client device 202. In embodiments, the device 210 can provide the application 220 to the user through a client application executing on the client device 202.

The device 210 can launch the application 220 having the provided file 212 or with the provided file 212 active within the application 220. For example, the device 210 can launch the application 220 and transfer or provide the file 212 to the application 220 such that a user of the client device can interact (e.g., edit, modify, save) with the file 212 using the application 220. In some embodiments, the file 212 can include a word file 212 or text file 212 and the device 210 can launch a text editing application 220 having the file 212 active within the text editing application 220 such that a user of the client device 202 can edit or modify the file 212 using the text editing application 220. In embodiments, the file 212 can include an image file 212 and the device 210 can launch an image editing application 220 having the file 212 active within the image editing application 220 such that a user of the client device 202 can edit or modify the file 212 using the image editing application 220.

In some embodiments, the device 210 can store records 248 corresponding to one or more user interactions with the device 210. For example, the user interactions include providing a file 212 to the device 210 and/or requesting an application 220. The device 210 can identify and store the user interactions corresponding to one or more files 212 and/or one or more applications 220 and generate a new record 248 for the respective user of the client device 202 and/or the client device 202 the user interaction was performed at. The device 210 update an existing record 248 to include the user interactions. For example, when the device 210 receives a file 212 and/or application 220 request, the device 210 can store data corresponding the file 212 (e.g., file name, file type, features, user, client device) and/or data corresponding to the requested application 220 (e.g., application name, application type, user, client device). The device 210 can store the file and/or application data at a storage device 206 of the device 210 and/or upload, provide or store the file and application data at the second service 240. For example, the device 210 can update or generate new record for the file and/or application data at a storage device 206 of the device 210 and/or update or generate new record for the file and application data at the second service 240. In embodiments, the device 210 can store the data extracted from the file 212 and generate a new record 248 for the user or update an existing record 248 to include the extracted file data. The device can provide and/or store the new record 248 or updates to the existing record 248 to a record databased of the device 210 and/or a record database of the second service 240. For example, the device 210 can transmit a request to the second service 240 to generate a new record 248 for the user interaction (e.g., provided file, requested application) with the device 210 and/or update an existing record 248 for the user interaction (e.g., provided file, requested application) with the device 210. The request can include, but is not limited to, a file name, file type, one or more features, an application name, an application type, an identification of the user of the client device, and an identification of the client device. In embodiments, the record 248 can include data associated with the user of the client device, a user profile, data associated with the selected application 220 and/or data associated with previous interactions of the user with the device 210.

Figure 3B:
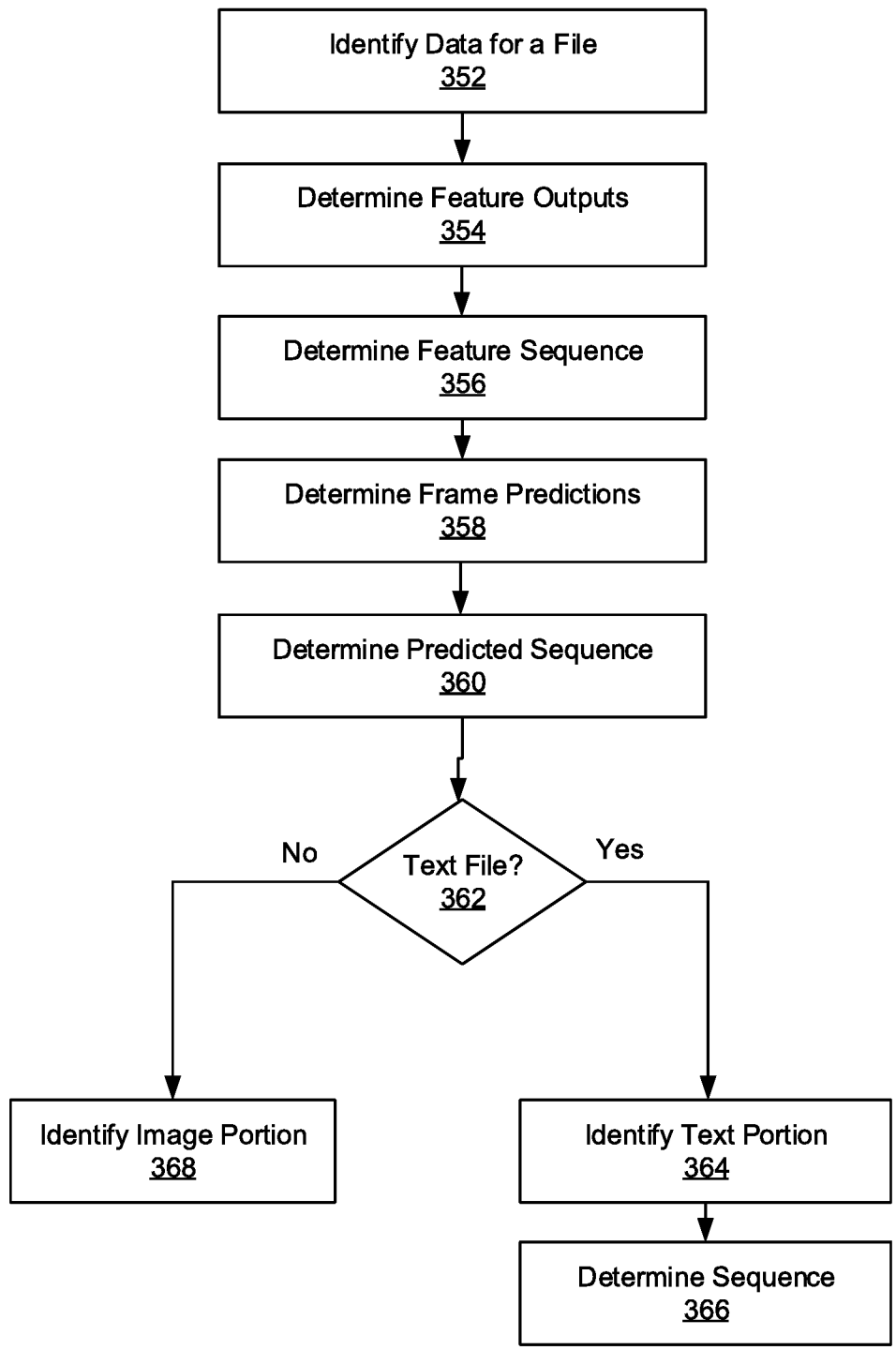
FIG. 3B is a flow diagram of an example algorithm for identifying one or more features of a file.

Referring now to FIG. 3B, depicted is a flow diagram of one embodiment of an algorithm 242 for identifying one or more features of a file. In brief overview, the algorithm 242 can include one or more of: identifying data for a file (352), determining feature outputs (354), determining a feature sequence (356), determining frame predictions (358), determining a predicted sequence (360), determining a file type (362), identifying a text portion (364), determining a sequence (366), and determining an image portion (368). The functionalities of the algorithm 242 may be implemented using, or performed by, the components detailed herein in connection with FIGS. 1A-2 and 4A-4C (e.g., device 210).

Referring now to operation (352), and in some embodiments, data for a file can be identified. The device 210 can execute the algorithm 242 (e.g., OCR algorithm, identification algorithm, extraction algorithm) to identify and/or extract data, including but not limited to, properties of the file 212, properties of different portions of the file 212 and/or a file type. For example, the algorithm 242 can include determining if the file 212 includes one or more text portions (e.g., text, characters, symbols), one or more image portions or a combination of text portions and image portions. In embodiments, the algorithm 242 can include or correspond to a neural network 244, a classifier, classification model, k-nearest neighbors, naïve bayes classifier, support vector machine, and/or learning algorithm. For example, the algorithm 242 can include, but is not limited to, a connectionist text proposal network (CTPN), one or more convolutional layers, one or more recurrent layers, one or more transcription layers, a recurrent neural network (RNN), long-short term RNN, convolutional neural network (e.g., VGG16 model), convolutional recurrent neural network (CRNN), connectionist temporal classification (CTC).

Referring now to (354), and in some embodiments, one or more feature outputs can be determined. In embodiments, the device 210 can execute the algorithm 242 to determine one or more feature outputs for the file 212 or associated with the file 212. For example, the algorithm 242 can include a model (e.g., pre-trained VGG16 model) and the device 210 can provide the file 212 (e.g., image of the file, metadata of the file) and the properties of the file 212 to the model. In some embodiments, the device 210 can train the model with a dataset (e.g., image dataset) using a plurality of previous files 212 and plurality of records 248 associated with the plurality of files 212 and a plurality of users of the device 210. The algorithm 242 can generate one or more feature outputs for the file 212 or associated with the file 212. The feature outputs can include, but are not limited to, outputs from a last layer of the model and/or a convolutional map of the model (e.g., of the final convolutional map of the VGG16 model).

Referring now to (356), and in some embodiments, a feature sequence can be determined. The device 210 can execute the algorithm 242 and provide or pass the feature outputs to a spatial window (e.g., 3×3 spatial window) of the algorithm 242. In some embodiments, the output of the spatial window can include a feature sequence corresponding to or associated with the file 212. The feature sequence can include or correspond to an organization or sequence of the determined feature outputs.

Referring now to (358), and in some embodiments, per-frame predictions can be determined. The device 210 can execute the algorithm 242 and provide the outputs of the spatial window (e.g., the feature sequence) to a recurrent neural network 244 (e.g., 256 bi-directional RNN). The device 210 can execute the algorithm 242 to provide the output from the recurrent neural network 244 to a connected layer (e.g., 512-D fully connected layer). For example, the algorithm 242 can include a recurrent neural network 244 and a connected layer to generate a distribution or a directed graph corresponding to per-frame predictions for one or more portions of the file 212. In one embodiment, the per-frame predictions can include or indicate a prediction on whether a portion of the file 212 includes text (e.g., a letter, character, alphanumerical character) or an image (e.g., object).

Referring now to (360), and in some embodiments, a predicted sequence can be determined. The device can execute the algorithm 242 and generate one or more predicted sequences for the file 212 using the per-frame predictions (e.g., output from connected layer). In some embodiments, the output from the connected layer can include, but not limited to, multiple different outputs (e.g., 2 different outputs, 3 different outputs), vertical coordinates (e.g., 2k vertical coordinates), text scores (e.g., 2k text scores), non-text scores (e.g., 2k non-text scores) and/or refinement values (e.g., k side refinement values). The predicted sequence can include or correspond to a text score assigned to the file 212. For example, the predicted sequence can include, but not limited to a text, a phrase or character identified in a file 212. In embodiments, a text score greater than or over a threshold level can indicate that the predicted sequence corresponds to a text portion of the file 212. A text score less than a threshold level can indicate that the predicted sequence corresponds to an image portion of the file 212 of that the file 212 does not include a predicted sequence.

Referring now to (362), and in some embodiments, a file type can be determined. The device 210 can execute the algorithm 242 to determine a file type of the file 212. For example, the algorithm 242 can use the identified data, predicted sequence and/or text scores to classify the file 212 as a particular file type. In embodiments, the algorithm 242 can classify the file type of the file 212 as, but not limited to, a text file 212, an image file 212 or a combination file 212 having a combination of at least on text portion and at least one image portion. The file type can vary based at least in part on the properties of the respective file 212.

In some embodiments, the device 210 can use the text scores and/or non-text scores to determine if the file 212 includes text features 214. For example, the device 210 can compare the text score to a threshold level and if the text score is greater than the threshold level, the text score indicates the file 212 includes text features 214. The device 210 can compare the text score to the threshold level and if the text score is less than the threshold level, the text score indicates the file 212 does not include text features. The device 210 can execute the algorithm 242 to determine if the file type of the file 212 is a text file 212, an image file 212 or a combination file 212 having a combination of at least on text portion and at least one image portion.

Referring now to (364), and in some embodiments, a text portions can be identified. The device 210 can execute the algorithm 242 to identify one or more text portions of a file 212 responsive to determining the file type of the file 212 is a text file 212 or a combination file 212 that includes at least one text portion. For example, the device 210 can execute the algorithm 242 to identify the text properties (e.g., alphanumeric characters, phrases, symbols) of the at least one text portion of the combination file 212. The device 210, responsive to determining the file 212 includes text features 214, can perform text recognition on the file 212. The device 210 can execute an algorithm 242, perform optical character recognition (OCR) on the file 212 and/or execute a combination of algorithms and neural network components to perform text recognition. For example, in one embodiment, the device 210 can execute a convolutional recurrent neural network 244 and a connectionist temporal classification (CRNN+CTC) model.

Referring now to (366), and in some embodiments, one or more sequences can be determined. The device 210 can execute the algorithm 242 to predict one or more sequences of the file 212 according to text, alphanumeric characters or symbols of the file. For example, the device 210 can provide the file 212 to one or more convolutional layers of a neural network 244 to down sample the respective file 212 and generate one or more convolutional feature maps. The device 210 can provide the outputs of the convolutional layers (e.g., convolutional feature maps) to one or more recurrent layers. The device 210 can generate a feature sequence using the recurrent layers and from the convolutional feature maps. In some embodiments, the device 210 can generate a deep bidirectional long short term memory (LSTM) using the feature sequence. The device 210 can provide the deep bidirectional LSTM to one or more transcript layers to perform per-frame predictions (e.g., distributions). The device 210 can provide the per-frame predictions to the transcript layer to generate one or more predicted sequences corresponding to the file 212. In embodiments, the predicted sequences can correspond to words, text, characters, symbols and/or alphanumerical characters of the file 212. The device 210 can use the identified text portion, text portions and/or sequences of the file 212 to determine at least one application 220 to launch for the file 212, for example, as described with respect to (308) of method 300.

Referring now to (368), and in some embodiments, image portions can be identified. The device 210 can execute the algorithm 242 to identify one or more image portions of a file 212 responsive to determining the file type of the file 212 is an image file 212 or a combination file 212 that includes at least one image portion. For example, the device 210 can execute the algorithm 242 to identify the image properties (e.g., object) of the at least one image portion of the combination file 212. The device 210, responsive to determining the file 212 does not text features 214, can determine the file 212 corresponds to an image file 212. The device 210 can execute the algorithm 242 to classify an image of the file 212. The device 210 can determine, responsive to executing the algorithm 242, one or more objects according to the image of the file 212. For example, the device 210 can execute a classification model to identify and classify the image file 212 into one or more objects or identify one or more object features 214 of the image file 212. In one embodiment, the device 210 can execute an algorithm 242 (e.g., k-nearest neighbors, naïve bayes classifier (e.g., equation 2), support vector machine) to identify object features 214 of the file 212.

$$P(A\mid B) = \frac{P(B\mid A)P(A)}{P(B)} \quad (2)$$

Where P(A) represents or indicates that "the probability that A is true,", P(B) represents or indicates that "the probability that B is true,", P(B|A) represents or indicates that "the probability that B is true given that A is true,' and P(A|B) represents or indicates that "the probability that A is true given that B is true." The device 210 can use the identified image portion or image portions of the file 212 to determine at least one application 220 to launch for the file 212, for example, as described with respect to (308) of method 300.

FIG. 4A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 432 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistance through either the resource access application 424 or directly from another resource, such as Microsoft Teams. This feature may allow employees to work efficiently, stay organized, and deliver only the specific information they're looking for.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method comprising:
   receiving, by a device comprising one or more processors coupled with memory, a file from a user of a client device;
   selecting, by the device based on a file type of the file, an algorithm from a plurality of algorithms stored on the device to identify one or more features of data included in the file to generate a listing of one or more applications that are configured to execute the file;
   executing, by the device, the selected algorithm on the data included in the file to identify the one or more features of the data to generate the listing of the one or more applications that are configured to execute the file;

determining, by the device, according to the identified one or more features of the data in the file, the one or more applications to execute the file on the client device;

providing, by the device to the user through the client device, the listing of the one or more applications to cause the client device to launch an application of the one or more applications to execute the file;

transmitting, by the device to a service associated with the device, a request for a record associated with the user;

receiving, by the device from the service, a response including the record associated with the user; and applying, by the device, the one or more features of the data included in the file and data from the record to the application from the listing of the one or more applications prior to executing the application for the user.

2. The method of claim 1, further comprising:
determining, by the device, whether the one or more features of the data included in the file include one of: text, alphanumeric characters or symbols.

3. The method of claim 1, further comprising:
predicting, via execution of the algorithm by the device, one or more sequences of the one or more features of the data included in the file according to text, alphanumeric characters or symbols of the file.

4. The method of claim 1, further comprising:
executing, by the device, the algorithm to classify an image of the file; and
determining, by the device responsive to executing the algorithm, one or more objects according to the image of the file.

5. The method of claim 1, further comprising:
filtering, by the device according to the file type of the file, a plurality of applications to execute the file; and
generating, by the device, a first subset of the plurality of applications to execute the file.

6. The method of claim 5, further comprising:
filtering, by the device according to the one or more features, the first subset of the plurality of applications to generate a second subset of the plurality of applications to execute the file; and
determining, by the device, scores for applications included in the second subset according to the one or more features and the user of the client device.

7. The method of claim 6, further comprising:
selecting, by the device from the second subset, the one or more applications for the listing of the one or more applications according to the score assigned to each of the applications included in the second subset.

8. A system comprising:
a device comprising one or more processors coupled to memory, the device configured to:
receive a file from a user of a client device;
select, based on a file type of the file, an algorithm from a plurality of algorithms stored on the device to identify one or more features of data included in the file;
execute the selected algorithm on the data included in the file to identify the one or more features of the data;
determine, according to the identified one or more features of the data in the file, one or more applications to execute the file on the client device;
provide, to the user through the client device, a listing of the one or more applications to cause the client device to launch an application of the one or more applications to execute the file;
transmit, to a service associated with the device, a request for a record associated with the user;
receive, from the service, a response including the record associated with the user; and
apply the one or more features of the data included in the file and data from the record to the application from the listing of the one or more applications prior to executing the application for the user.

9. The system of claim 8, wherein the device is configured to:
determine whether the one or more features of the data included in the file include one of: text, alphanumeric characters or symbols.

10. The system of claim 8, wherein the device is configured to:
predict, via execution of the algorithm, one or more sequences of the one or more features of the data included in the file according to text, alphanumeric characters or symbols of the file.

11. The system of claim 8, wherein the device is configured to:
execute the algorithm to classify an image of the file; and
determine, responsive to executing the algorithm, one or more objects according to the image of the file.

12. The system of claim 8, wherein the device is configured to:
filter, according to the file type of the file, a plurality of applications to execute the file; and
generate a first subset of the plurality of applications to execute the file.

13. The system of claim 12, wherein the device is configured to:
filter, according to the one or more features, the first subset of the plurality of applications to generate a second subset of the plurality of applications to execute the file; and
determine scores for applications included in the second subset according to the one or more features and the user of the client device.

14. The system of claim 13, wherein the device is configured to:
select, from the second subset, the one or more applications for the listing of the one or more applications according to the score assigned to each of the applications included in the second subset.

15. A non-transitory computer-readable medium, comprising instructions that, when executed by a processor of a device, cause the processor to:
receive a file from a user of a client device;
select, based on a file type of the file, an algorithm from a plurality of algorithms stored on the device to identify one or more features of data included in the file;
execute the selected algorithm on the data included in the file to identify the one or more features of the data;
determine, according to the identified one or more features of the data in the file, one or more applications to execute the file on the client device;
provide, to the user through the client device, a listing of the one or more applications to cause the client device to launch an application of the one or more applications to execute the file;
transmit, to a service associated with the device, a request for a record associated with the user;
receive, from the service, a response including the record associated with the user; and
apply the one or more features of the data included in the file and data from the record to the application from the listing of the one or more applications prior to executing the application for the user.

\* \* \* \* \*